UNITED STATES PATENT OFFICE.

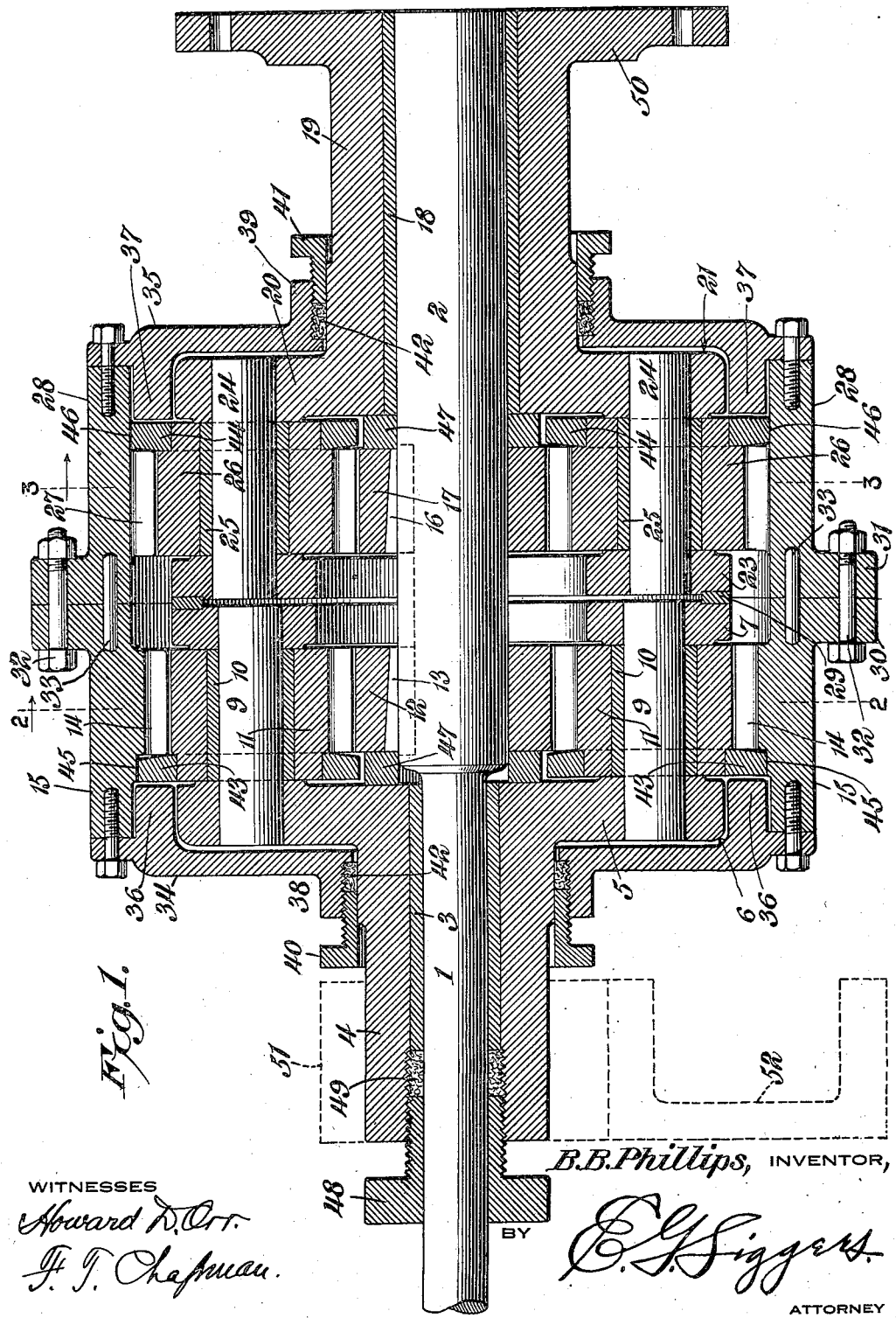

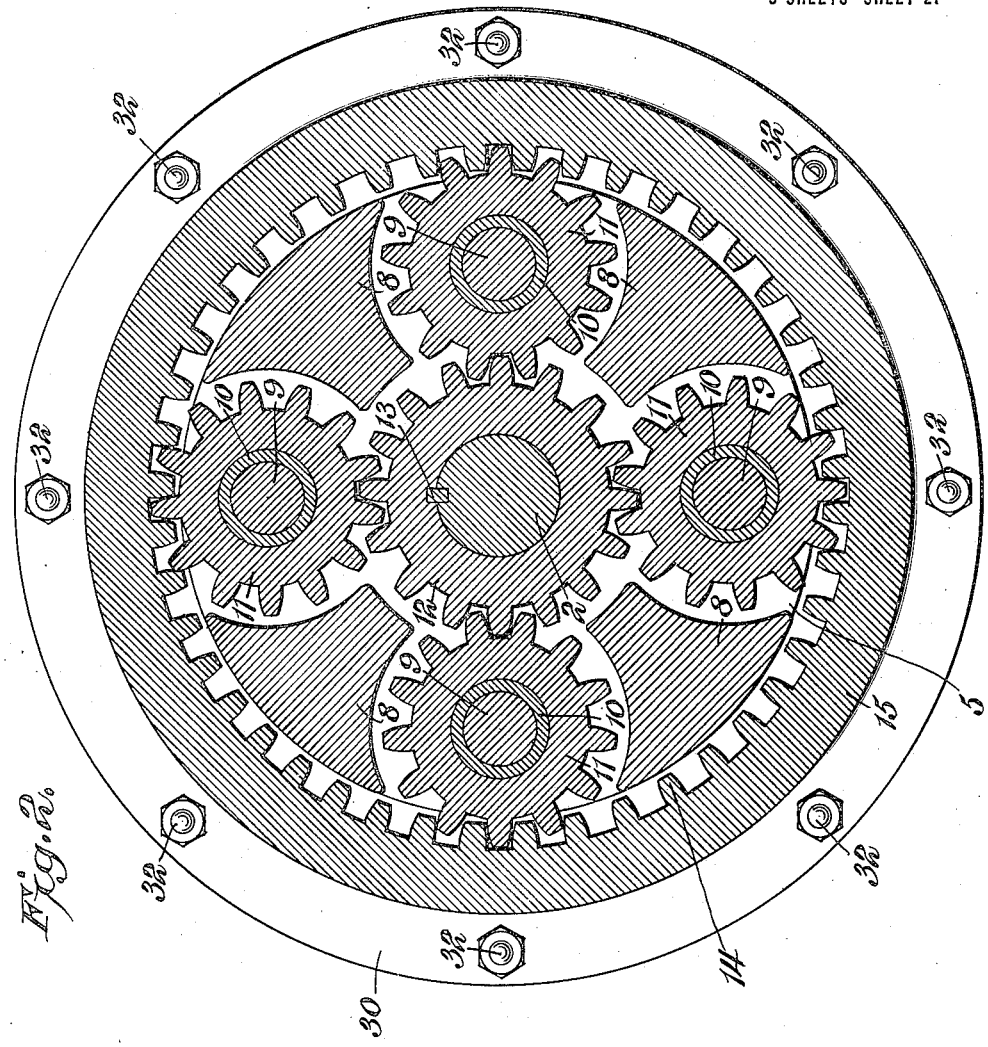

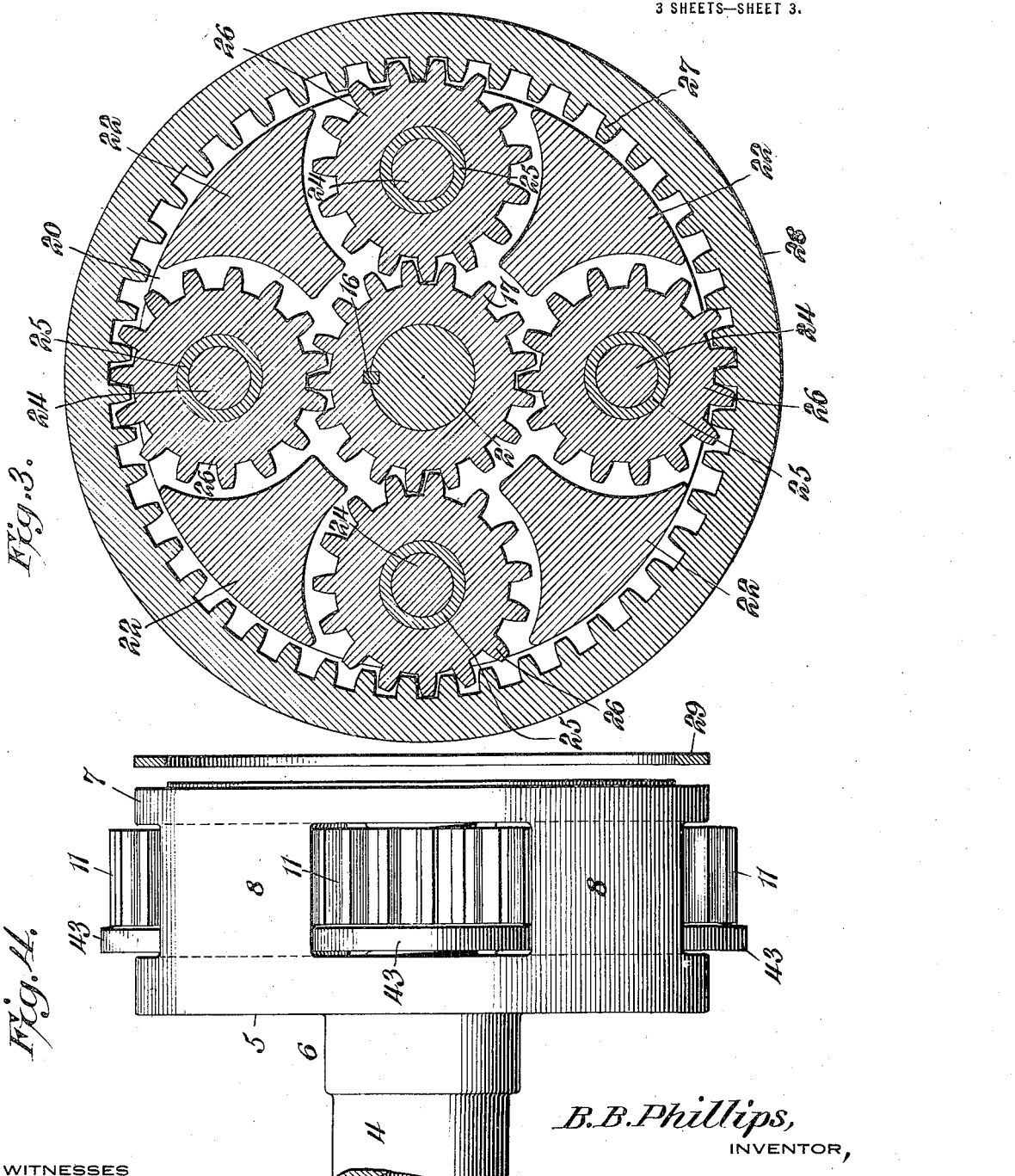

BYRON B. PHILLIPS, OF HUDSON, NEW YORK.

SPEED-REDUCING POWER-TRANSMITTING MECHANISM.

1,414,894.          Specification of Letters Patent.      Patented May 2, 1922.

Application filed June 14, 1918. Serial No. 240,026.

*To all whom it may concern:*

Be it known that I, BYRON B. PHILLIPS, a citizen of the United States, residing at Hudson, in the county of Columbia and State of New York, have invented a new and useful Speed-Reducing Power-Transmitting Mechanism, of which the following is a specification.

This invention has reference to speed reducing power transmitting mechanism, and its object is to provide a mechanism for the purpose whereby great variation in speed reduction may be effected without any marked changes in the size of the apparatus.

In accordance with the invention, there is provided a power shaft carrying two different planetary gearings both primarily driven by the power shaft and both provided with a crown gear common to them, the motion being transmitted from the power shaft to the driven side of the apparatus through the common crown gear with certain parts of the gearing of one planetary gearing being reactively driven and in turn directly driving the driven member.

The actuation of the driven member is dependent upon the operation of two similarly driven but dissimilar planetary gearings and the necessity of a portion of one of the gearings accommodating itself to the dissimilarity between the two gearings by setting up a motion within itself compensating for such dissimilarity and this motion is transmitted to the driven member. With such an apparatus and with the dissimilarity between the two planetary gearings small, a high speed of the power shaft will result in a low speed of the driven member. With the dissimilarity more pronounced the speed of the driven member is correspondingly raised.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a longitudinal diametric section of a structure embodying the invention.

Figure 2 is a section on the line 2—2 of Figure 1.

Figure 3 is a section on the line 3—3 of Figure 1.

Figure 4 is a side elevation of the gear cage shown in Figure 2.

Referring to the drawings, there is shown a power shaft 1 which may be considered as being driven by any suitable source of power. This power shaft 1 has a terminal portion 2 of enlarged cross section, which enlargement is made because of local strains to which the power shaft is subjected.

The smaller end of the power shaft 1 is surrounded by an elongated bushing 3 and mounted on this bushing is a sleeve 4 terminating at one end in a radially expanded head 5 forming one head of a cage 6, said cage being provided with another head 7 joined to the head 5 by connecting bars 8 which may be formed integral with the heads 5 and 7. These connecting bars 8 are of generally segmental form and equally spaced apart circumferentially of the cage, which latter is of cylindrical shape. The opposite faces of the connecting bars are concave and these bars are mounted in and extending between the two heads 5 and 7. The pintles are each fixed to the respective heads of the cage carrying them and each pintle has on it a bushing 10 on which, in turn, is mounted a pinion 11. Mounted on the large portion 2 of the shaft 1 is a king pinion or gear 12 made fast to the shaft, so as to rotate therewith, by a key 13. The pinion 12 is in mesh with the pinion 10 and the pinion 10 is in mesh with gear teeth 14 on the inner wall of an internal gear 15.

In the particular showing of the drawings, there are four pintles 9 and four pinions 11 driven commonly by a single king gear 12 and all four pinions 11 are in mesh with the teeth 14 of the gear 15.

Mounted on the shaft section 2 and fixed thereto by a key 16 is another king gear 17 along side of but spaced from the king gear 12. Also mounted on the enlarged portion 2 of the shaft 1 is a bushing 18 on which, in turn, is mounted a sleeve 19 similar to the sleeve 4 but at the end of the power shaft remote from the sleeve 4. The sleeve 19 has at the end adjacent to the sleeve 4 a radially outstanding head 20 similar to the head 5 and forming part of a cage 21 similar to the cage 6. Forming part of the cage 21 and connected to the head 20 by connecting bars 22 is another head 23 adjacent to the head 7 but spaced a short distance therefrom. The bars 22 are segmental bars with adjacent faces concave and concentric to pintles 24 extending between and mounted in the heads 20 and 23 the same as the pintles 9 are mounted in the heads 5 and 7 of the cage 6. The pintles 24 each carry a bushing 25 and on each bushing is mounted a pinion 26 meshing with the king gear 17 and also meshing with gear teeth 27 on an internal gear 28 similar to the gear 15 and, in the particular showing of the drawings, of the same external diameter.

The two heads 7 and 23 are closely contiguous but are held out of actual contact by a ring 29 seated in peripheral grooves on the matching faces of the two heads. In order to facilitate the assembling of the parts the two gears 15 and 28 are made separately and are provided with radially outstanding flanges 30 and 31 with matching perforations for the passage of bolts 32 for securing the gears together, the bolts being relieved from twisting strain by socket pins 33 each extending into both gears where meeting.

Those edges of the two gears remote from the flanges 30 and 31 have face plates 34 and 35 fastening to them, the face plate 34 being fast to the gear 15 and the face plate 35 being fast to the gear 28, cap screws 36 being used for the purpose. The face plate 34 has a circular outstanding flange 36 overriding the head 6 and the face plate 35 has a similar outstanding flange 37 overriding the head 20, the two flanges being interposed between the peripheral portions of the respective heads and the corresponding portions of the two gears 15 and 28.

The faces plates 34 and 35 are brought into close relation to the respective sleeves 4 and 19 and are there formed into screw sockets 38, 39 respectively, surrounding the respective sleeves 4 and 19 and each entered by a packing gland 40 or 41 holding packing 42 in the respective screw socket.

Each pinion 11 is grooved at one end to receive a ring 43 and each pinion 26 is similarly grooved to receive a ring 44, these rings bearing against grooves or tracks 45, 46 formed in the inner faces of the internal gears between the teeth 14 and 27 and the outer edges of said gears. Surrounding the enlarged portion 2 of the shaft 1 are thrust rings 47 between the king gears 12 and 17 and the inner faces of the heads 6 and 20 respectively.

Where the sleeve 4 is entered by the shaft 1 it is interiorly screw-threaded to receive a packing gland 48 confining packing 49 about the shaft 1 and against the sleeve 3. The enlarged portion 2 of the shaft 1 is carried out to the end of the sleeve 19 and may stop flush therewith, said sleeve having a radially outstanding flange 50 to which may be secured the part to be driven.

No attempt has been made in the drawings to show any particular number of gear teeth and size of gears and pinions, but in order that the working of the structure may be more easily explained it will be assumed that the structure is so built and proportioned as to produce certain speeds of rotation of the different parts. Let it be assumed that the power shaft is rotating 1200 times per minute and let it further be assumed that the sleeve 4 is gripped tight in a bearing 51 mounted on a fixed support 52, the bearing 51 and the support 52 being shown in dotted lines in Figure 1. The purpose of the bearing 51 is to hold the sleeve 4 and head 6 formed thereon against rotation, wherefore, the pintles 9 are also held against rotation about the longitudinal axis of the shaft 1.

On rotating the shaft 1 the king gears 12 and 17 rotate at the same speed as the shaft, namely, 1200 R. P. M. Since the king gear 12 is rotating, a rotative movement is imparted to all the pinions 11 on the pintles 9 at a rate depending upon the number of teeth of the king gear 12 and each pinion 11. Rotative movement of the pinions 11 each upon its own axis imparts a rotative movement to the internal gear 15. If it be assumed that the relation of the pinions 12 and 11 and the teeth of the gear 15 be such as to cause 3 to 1 reduction of speed of the said gear 15, then the internal gear will have a speed of 400 R. P. M. Since the gear 15 is rigidly fast to the gear 28, said gear 28 will also rotate at a speed of 400 R. P. M.

The speed of the king gear 17 is also 1200 R. P. M., since this king gear is fast to the enlargement 2 of the shaft 1. Let it further be assumed that the reduction of speed between the king gear 17 and the internal gear 28 is 4 to 1. It follows then that the internal gear 28 should rotate under the driving power of the shaft at a speed of 300 R. P. M. Its speed, however, is, under the conditions assumed, necessarily 400 R. P. M. so that there is a difference between the actual speed of the internal gear 28 and that at which it should rotate under the driving power of the shaft 1 of 100 R. P. M. This difference must, therefore, be compensated for by the pinions 26 which are interposed between and mesh with the king gear 17 and the internal gear 28. This occurs and there is therefore imparted to the head 20 and coupling flange 50 a speed of 100 R. P. M. in a direction corresponding to the direction of rotation of the shaft 1.

In the example considered the rotation of the driven members depends upon the orbital mobility of the intermediate set of gears of the second planetary gearing with the corresponding set of gears of the first planetary gearing held against orbital movement. By even slight changes in the ratio of the gearing marked changes in the relative speeds of the drive and driven members may be brought about. Without any particularly noticeable variation in the sizes of the parts or of the whole structure it is quite possible to get so great a variation in speed between the driving and driven members as 30,000 to 1, and again the speed difference may, with other changes, be brought close to or even to unity.

The face plates 34 and 35 and the packing glands are provided to permit the immersion of the gearing in oil or other lubricant as is the customary practice in mechanisms of this kind. The rings 45 and 46 serve as antifriction bearings and the rings 29 and 47 as thrust bearings, whereby undue play of the parts is prevented.

By splitting the internal gear into two parts and providing the two parts with matching flanges 30 and 31 and connecting them by the bolts 32, the assemblage of the structure is greatly facilitated, since each planetary gearing may be assembled separately and afterward joined in close juxtaposition on the shaft 1 and its extension 2.

The transmission gearing is capable of working either way and may be used for transmitting power for a great variety of purposes.

What is claimed is:

1. Speed changing gearing, comprising a shaft, neighboring gears fast thereon, gear cages each carrying a circular series of pinions meshing with and individual to a respective one of the first named gears with each cage traversed by the shaft, one of the gear cages having means whereby it may be held against rotation and the other gear cage having means for connecting it to a part to be driven, internal gears surrounding and individual to the gear cages and meshing with the gears therein, said internal gears being fixedly connected together for common rotation, and rings carried by the circular series of gears and constituting antifriction members for rotating parts of the speed changing gearing, the gear cages being located in close relation and provided with a thrust ring between them.

2. Speed changing gearing, comprising a shaft, neighboring gears fast thereon, gear cages each carrying a circular series of pinions meshing with and individual to a respective one of the first named gears with each cage traversed by the shaft, one of the gear cages having means whereby it may be held against rotation and the other gear cage having means for connecting it to a part to be driven, internal gears surrounding and individual to the gear cages and meshing with the gears therein, said internal gears being fixedly connected together for common rotation, rings carried by the circular series of gears and constituting antifriction members for rotating parts of the speed changing gearing, the gear cages being located in close relation and provided with a thrust ring between them, and face plates fast to the internal gears and constituting closures for the interior of the speed changing gearing whereby the rotating parts of the speed changing gearing may run in lubricant.

In testimony that I claim the foregoing as my own, I have hereto affixed my signature.

BRYON B. PHILLIPS.

Witnesses:
 E. M. KARR,
 A. C. BENNETT.